US012745075B2

(12) United States Patent
Kelly et al.

(10) Patent No.: US 12,745,075 B2
(45) **Date of Patent: *Sep. 22, 2026**

(54) SYSTEMS AND METHODS FOR SECURELY PAIRING A TRANSMITTING DEVICE WITH A RECEIVING DEVICE

(71) Applicant: Capital One Services, LLC, McLean, VA (US)

(72) Inventors: Kevin P. Kelly, Austin, TX (US); Saleem A. Sangi, McLean, VA (US); Robert T. Perry, Ashburn, VA (US); Adam R. Koeppel, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 77 days.

This patent is subject to a terminal disclaimer.

(21) Appl. No.: 18/798,759

(22) Filed: Aug. 8, 2024

(65) Prior Publication Data

US 2024/0406720 A1 Dec. 5, 2024

Related U.S. Application Data

(63) Continuation of application No. 18/146,584, filed on Dec. 27, 2022, now Pat. No. 12,075,238, which is a (Continued)

(51) Int. Cl.
*H04L 29/06* (2006.01)
*G06F 16/955* (2019.01)

(Continued)

(52) U.S. Cl.
CPC ........ *H04W 12/04* (2013.01); *G06F 16/9554* (2019.01); *G06F 21/445* (2013.01); *G06F 21/606* (2013.01); *G06K 7/1404* (2013.01); *G06K 7/1417* (2013.01); *G06K 19/06037* (2013.01); *G06Q 20/3274* (2013.01); *G06Q 20/3276* (2013.01); *H04L 9/0819* (2013.01); *H04L 9/0838* (2013.01); *H04L 9/0866* (2013.01); *H04L 9/0891* (2013.01); *H04L 9/3226* (2013.01); *H04L 9/3234* (2013.01); *H04L 63/18* (2013.01); *H04L 67/04* (2013.01);

(Continued)

(58) Field of Classification Search
None
See application file for complete search history.

(56) References Cited

U.S. PATENT DOCUMENTS 9,088,552 B2 * 7/2015 Pinder .................. H04W 12/04
2012/0245947 A1 * 9/2012 Neuendorf ............. G10L 19/20
704/500

(Continued)

*Primary Examiner* — Maung T Lwin
(74) *Attorney, Agent, or Firm* — Foley & Lardner LLP

(57) ABSTRACT

Systems and methods for securely pairing a transmitting device with a receiving device are described. The systems and methods may communicate with a first device via a first communication method over a wireless communication network. The systems and methods may transmit, to the first device via a second communication method, a first sensory pattern representing a first key. In addition, the system and methods may communicate with the first device via the first communication method using the first key.

20 Claims, 7 Drawing Sheets

Related U.S. Application Data continuation of application No. 17/338,076, filed on Jun. 3, 2021, now Pat. No. 11,563,775, which is a continuation of application No. 16/571,319, filed on Sep. 16, 2019, now Pat. No. 11,032,322, which is a continuation of application No. 16/150,641, filed on Oct. 3, 2018, now Pat. No. 10,447,735, which is a continuation of application No. 15/826,580, filed on Nov. 29, 2017, now Pat. No. 10,122,756, which is a continuation of application No. 15/814,607, filed on Nov. 16, 2017, now Pat. No. 10,313,393.

(51) Int. Cl.

| | |
|---|---|
| ***G06F 21/44*** | (2013.01) |
| ***G06F 21/60*** | (2013.01) |
| ***G06K 7/14*** | (2006.01) |
| ***G06K 19/06*** | (2006.01) |
| ***G06Q 20/32*** | (2012.01) |
| ***H04L 9/08*** | (2006.01) |
| ***H04L 9/32*** | (2006.01) |
| ***H04L 9/40*** | (2022.01) |
| ***H04L 67/04*** | (2022.01) |
| ***H04L 69/18*** | (2022.01) |
| ***H04W 12/03*** | (2021.01) |
| ***H04W 12/04*** | (2021.01) |
| ***H04W 12/0471*** | (2021.01) |
| ***H04W 12/06*** | (2021.01) |
| ***H04W 12/50*** | (2021.01) |
| *H04W 4/80* | (2018.01) |

(52) U.S. Cl.

CPC ............ *H04L 69/18* (2013.01); *H04W 12/03* (2021.01); *H04W 12/0471* (2021.01); *H04W 12/06* (2013.01); *H04W 12/50* (2021.01); *H04L 2209/805* (2013.01); *H04W 4/80* (2018.02)

(56) References Cited

U.S. PATENT DOCUMENTS

| | | | | |
|---|---|---|---|---|
| 2014/0059352 | A1* | 2/2014 | Haga | H04L 63/061 713/171 |
| 2014/0281547 | A1* | 9/2014 | Modzelewski | H04L 63/18 713/171 |
| 2014/0380047 | A1* | 12/2014 | Denning | H04L 9/0825 713/168 |
| 2018/0365853 | A1* | 12/2018 | Yang | G06T 7/75 |

* cited by examiner

SYSTEMS AND METHODS FOR SECURELY PAIRING A TRANSMITTING DEVICE WITH A RECEIVING DEVICE

CROSS-REFERENCE TO RELATED PATENT APPLICATIONS

This application is a Continuation of U.S. patent application Ser. No. 18/146,584, filed Dec. 27, 2022, which is a Continuation of U.S. patent application Ser. No. 17/338,076, filed Jun. 3, 2021, which is a Continuation of U.S. patent application Ser. No. 16/571,319, filed Sep. 16, 2019, which is a Continuation of U.S. patent application Ser. No. 16/150,641, filed Oct. 3, 2018, which is a Continuation of U.S. patent application Ser. No. 15/826,580, filed Nov. 29, 2017, which is a Continuation of U.S. patent application Ser. No. 15/814,607, filed Nov. 16, 2017, each of which applications is incorporated herein by reference in its entirety.

TECHNICAL FIELD

The disclosed embodiments generally relate to information technology security, and more particularly, to securely pairing a transmitting device with a receiving device.

BACKGROUND

Recent advances in technology often require a connection to be established between two devices. Establishing a connection between two devices is often referred to as pairing. To pair, devices often use communication protocols, such as Bluetooth™ or Wireless, that enable the devices to communicate with each other in order to establish the connection. Typically, the process for pairing devices requires the devices to authenticate with each other by sharing security keys via these communication protocols. A security key, which is alternatively often referred to as a private key or secret key, must remain secret between the communicating parties if it is intended that future communication, including long range communication, between the communicating paired devices is to remain private.

However, communication protocols, such as Bluetooth™ or Wireless, are often vulnerable to attacks by untrusted third parties. For example, an untrusted third-party may uncover the content of messages using specialized sniffing programs or techniques, such as blueprinting, bluesnarfing, bluebugging, bluejacking, bluesmacking, man-in-the-middle attacks, address resolution protocol spoofing, etc. An untrusted third-party may use one or more of these specialized techniques to uncover the security keys that are shared between the two devices, which, therefore, makes the connection between the two devices unsecure.

In some existing systems, a trusted authority may issue a certificate or other technique for communicating the secret key. Thus, the trusted authority may hide the secret from anyone listening to a network using complexed protocols and procedures. In addition, by requiring a trusted authority, these systems often increase the storage overhead as well as decrease the speed of pairing between the devices.

Thus, a new technique for sharing security keys between two devices is needed to reduce the risks of untrusted third parties from intercepting the security key when the security key is shared in the clear (i.e., unencrypted, or in an open environment using one or more of the communication protocols), increase the security and speed of pairing between the two devices, and reduce the amount of overhead that is required to share security keys. In view of these and other shortcomings and problems with securely pairing transmitting devices with receiving devices, improved systems and techniques for pairing devices are desirable.

SUMMARY OF THE INVENTION

The disclosed embodiments address disadvantages of existing systems by providing novel systems, methods, and techniques for securely pairing transmitting devices with receiving devices. Unlike any prior implementations, the disclosed systems and methods improve the pairing of a transmitting device with a receiving device by enabling transmitting and receiving devices to communicate secure messages via a primary communication method, such as radio frequencies, based on a security key shared via a secondary communication method, such as visible light, sound, thermal energy, vibration, or the like that may not share the same interception risks as radio frequencies, for example. Thus, the disclosed systems and methods may provide a secure pairing between a transmitting and receiving device by exchanging security keys via a more secure secondary communication method in order to securely communicate using a first communication method. Further, by using these more secure secondary communication methods, the risks of an un-trusted third party discovering the security key through eavesdropping may be reduced, speed of pairing between the two devices may be increased, and the amount of overhead that is required to share security keys may be reduced over pre-existing systems.

Consistent with certain disclosed embodiments, a method is provided for secure communication for secure communication between a receiving device and a first device. The method may include the step of communicating with a first device via a first communication method over a wireless communication network. The method may also include a step of acquiring, from the first device via a second communication method, a first sensory pattern representing a first key, the first key being a security key, wherein the second communication method is different from the first communication method. The method may further include a step of determining the first key by deciphering the first sensory pattern using a deciphering scheme. In addition, the method may include a step of communicating with the first device via the first communication method using the first key.

Moreover, consistent with certain disclosed embodiments, a system is provided for secure communication for secure communication between a receiving device and a first device. The system may include a memory storing instructions and one or more processors. The one or more processors may be configured to execute instructions to communicate with a first device via a first communication method over a wireless communication network. The one or more processors may also be configured to execute instructions to acquire, from the first device via a second communication method, a first sensory pattern representing a first key, the first key being a security key, wherein the second communication method is different from the first communication method. The one or more processors may be further configured to execute instructions to determine the first key by deciphering the first sensory pattern using a deciphering scheme. In addition, the one or more processors may be configured to execute instructions to communicate with the first device via the first communication method using the first key.

Consistent with certain disclosed embodiments, a method is provided for secure communication for secure communication between a transmitting device and a first device. The method may include a step of communicating with a first device via a first communication method over a wireless communication network. The method may also include a step of transmitting, to the first device via a second communication method, a first sensory pattern representing a first key, wherein the first key is a security key, wherein the second communication method is different from the first communication method, and wherein the first key is encoded using a ciphering scheme. The method may further include a step of communicating with the first device via the first communication method using the first key.

In addition, consistent with certain disclosed embodiments, a system is provided for secure communication between a transmitting device and a first device. The system may include a memory storing instructions and one or more processors. The one or more processors may be configured to execute instructions to communicate with a first device via a first communication method over a wireless communication network. The one or more processors may also be configured to execute instructions to transmit, to the first device via a second communication method, a first sensory pattern representing a first key, wherein the second communication method is different from the first communication method, and wherein the first key is encoded using a ciphering scheme. In addition, the one or more processors may be configured to execute instructions to communicate with the first device via the first communication method using the first key.

Aspects of the disclosed embodiments may also include a non-transitory tangible computer-readable medium that stores software instructions that, when executed by one or more processors, are configured for and capable of performing and executing one or more of the methods, operations, and the like consistent with the disclosed embodiments.

It is to be understood that both the foregoing general description and the following detailed description are exemplary and explanatory only, and are not restrictive of the disclosed embodiments as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
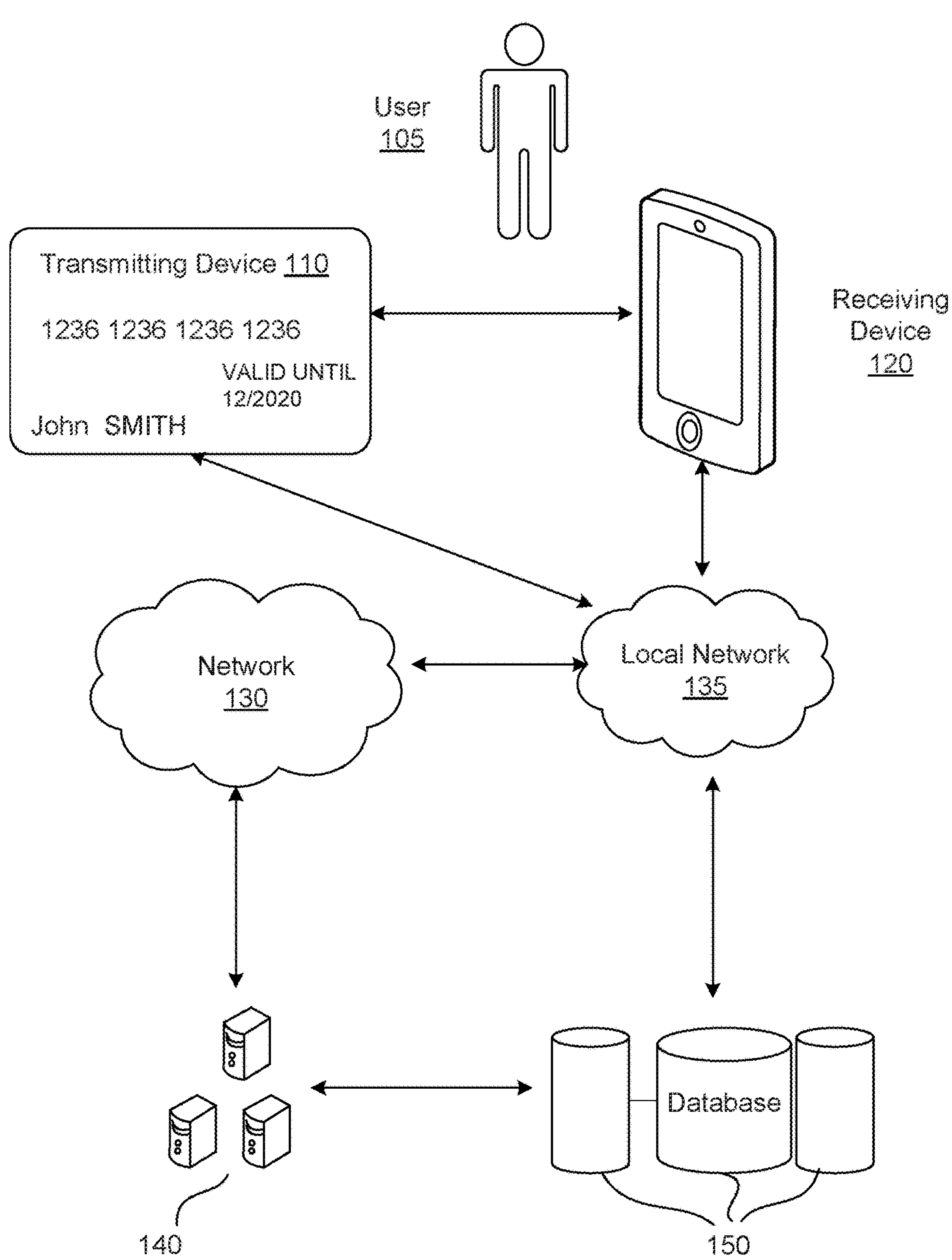
FIG. 1 is a block diagram of an example system environment for securely pairing a transmitting device with a receiving device.

The disclosed embodiments are directed to systems and methods for securely pairing a transmitting device with a receiving device. In particular, the disclosed systems and methods include techniques for pairing a transmitting device with a receiving device via a primary communication method based on a security key communicated via a secondary communication method. As an example, the disclosed embodiments may involve a scenario where a user's smart card attempts to set-up communications with a user's smartphone in order to send sensitive information (such as the smartcard's issuer identification number, expiration date, pin, and/or transactions conducted with the smart card, etc.) to the user's smartphone. Using this scenario, the user's smart card may attempt to transmit a security key to the user's smartphone in order to let the smartphone know that it can be trusted before sending the sensitive information. The smartphone, in turn, may want to check the security key against a known security key that it acquired from, for example, a server in order to verify that the smart card can be trusted.

In some embodiments, for example, a transmitting device may use a secondary communication method to communicate information representative of a security key to a receiving device. The second communication method may involve close-range non-radio modes of communication that are distinguished from the primary communication method. The second communication method may include, for example, transmitting a sensory pattern representing the security key using light (visible or non-visible), sound, thermal energy, vibration, or the like. In some embodiments, after the receiving device has acquired the sensory pattern, the receiving device may determine the security key by deciphering the pattern using a deciphering scheme. Once the receiving device determines the security key, the transmitting device or receiving device may communicate with each other via a primary method of communication, such as Bluetooth™ or other wireless or radio communication technologies, using the security key.

In some embodiments, the transmitting device and receiving device may acquire a pairing configuration from a server or local storage. A pairing configuration may include parameters that define how the transmitting and receiving device may communicate with each other. For example, the pairing communication may include parameters, such as a type of primary communication method, secondary communication method, deciphering scheme (or ciphering scheme), security key, etc. In some embodiments, the pairing configuration allows the transmitting device and/or receiving device to change a parameter of communication (e.g., primary communication method, secondary communication method, communication protocol, deciphering scheme, etc.) in real time. In addition, the transmitting device, receiving device, server, or an outside process may change the pairing configuration in real time.

Reference will now be made in detail to the disclosed embodiments, examples of which are illustrated in the accompanying drawings. Wherever convenient, the same reference numbers will be used throughout the drawings to refer to the same or like parts.

FIG. 1 shows a block diagram of an example system environment for securely pairing a transmitting device 110 with a receiving device 120. The components and arrangements shown in FIG. 1 are not intended to limit the disclosed embodiments, as the components used to implement the disclosed processes and features may vary.

In accordance with disclosed embodiments, system 100 may include transmitting device 110, receiving device 120, network 130, local network 135, pairing server(s) 140, and database(s) 150. Other components known to one of ordinary skill in the art may be included in system 100 to gather, process, transmit, receive, and provide information used in conjunction with the disclosed embodiments.

Transmitting device 110 may be a device comprising a memory, processor, and other specialized hardware that is configured to transmit a pattern using a particular communication method or medium to receiving device 120. For example, transmitting device 110 may include a transmitter capable of transmitting a pattern using a medium of light (e.g., a light-emitting diode, an incandescent light bulb, etc.), sound (e.g., a speaker, a digital audio transmitter, a frequency modulation transmitter), thermal energy (e.g., thermoelectric power generator, fan, infrared laser, etc.), vibrations (e.g., a motor, such as a Pico Haptic™ shaftless vibration motor, etc.), pulses of air (e.g., a fan, an air compressor, etc.) or the like to receiving device 120. Receiving device 120 may be a device comprising a memory, processor, and other specialized hardware that is configured to receive a pattern from transmitting device 110 that is transmitted using a particular communication method or medium. For example, receiving device 120 may include a sensor capable receiving or detecting a pattern transmitted by a medium of light (e.g., a camera, a light sensor, etc.), sound (e.g., a microphone, etc.), thermal energy (e.g., a thermal leak detector, a thermal energy etc.), vibrations (e.g., a piezoelectric accelerometer, a velocity sensor, a proximity probe, etc.), pulses of air (e.g., a piezoelectric accelerometer, a velocity sensor, a proximity probe, etc.), or the like from transmitting device 110.

Transmitting device 110 and receiving device 120 may be the same type of device or different types of devices. For example, in some embodiments, transmitting device 110 and/or receiving device 120 may be a type of card or card-like device such as an ID card, a membership card, a credit card, a debit card, an ATM card, a gift card, or any other type of card or other card-like device associated with at least one account. As another example, transmitting device 110 and/or receiving device 120 may be a type of personal computing device such as, for example, a mobile device with computing ability, a tablet, smartphone, wearable device such as Google Glass™ or a smart watch, a general purpose or notebook computer, or any combination of these computers and/or affiliated components. Transmitting device 110 and/or receiving device 120 may, as an additional example, be a device worn and/or carried by user 105 such as, for example, a fob, a key fob, a wristband, a necklace, or any other portable electronic device.

Transmitting device 110 and/or receiving device 120 may also be associated with a user 105. In some embodiments, user 105 is an individual associated with one or more accounts, and transmitting device 110 and/or receiving device 120 may be associated with or may include information concerning one or more of these accounts.

Network 130 may comprise any type of computer networking arrangement used to exchange data. For example, network 130 may be the Internet, a private data network, virtual private network using a public network, and/or other suitable connection(s) that enables the components of system 100 to send and receive information. Network 130 may also include a public switched telephone network ("PSTN") and/or a wireless network such as a cellular network, wired Wide Area Network (WAN), WiFi network, or other known wireless network (e.g., WiMAX) capable of bidirectional data transmission.

Local network 135 may comprise any type of computer networking arrangement used to exchange data in a localized area, such as WiFi based on IEEE 802.11 standards, Bluetooth™ Ethernet, and other suitable network connections that enable components of system 100 to interact with one another and to connect to network 130 for interacting with components in system environment 100. In some embodiments, local network 135 comprises a portion of network 130. In other embodiments, components of system 100 may communicate via network 130 without a separate local network 135.

Pairing server(s) 140 may include one or more computer-based systems including computer system components, desktop computers, workstations, tablets, hand held computing devices, memory devices, and/or internal network(s) connecting the components. In some embodiments, pairing server 140 may be enabled for cloud computing. Pairing server 140 may include a physical and/or virtual storage system associated with cloud storage for storing data and providing access to data via network 130. Pairing server 140 may include cloud services such as those offered by, for example, Amazon®, Apple®, Cisco®, Citrix®, IBM®, Joyent®, Google®, Microsoft®, Rackspace®, Salesforce.com®, and Verizon®/Terremark®, or other types of cloud services accessible via network 130. In some embodiments, pairing server 140 comprises multiple computer systems spanning multiple locations and having multiple databases or multiple geographic locations associated with a single or multiple cloud storage services.

As used herein, pairing server 140 refers to physical and virtual infrastructure associated with a single cloud storage service. In some embodiments, pairing server 140 manages and/or stores data in database 150. In addition, pairing server 140 may be owned and/or operated by an entity responsible for issuing (e.g., creating or authorizing the creation of) transmitting device 110 and maintaining one or more accounts associated with transmitting device 110. In some embodiments, pairing server 140 is associated with one or more of membership facilities, such as fitness centers, government organizations, such as state governments or departments of motor vehicles, banks, credit card companies, hospitals, hotels, or any other entities that may issue devices such as transmitting device 110, and/or maintain one or more accounts. In some embodiments, pairing server 140 may be configured to authenticate a transmitting device 110 or receiving device 120 based on one or more known authentication techniques before providing configuration data or other information, such as a security key of the disclosed embodiments, to the transmitting device 110 and/or receiving device 120.

Database 150 may include one or more memory devices that store data and instructions used to perform one or more aspects of the disclosed embodiments. In some aspects, components of system 100 (shown and not shown) may be configured to receive, obtain, gather, collect, generate, or produce information to store in databases 150. For example, in some embodiments, database 150 may store information, such as one or more pairing configurations for the secure pairing associated with transmitting device 110, receiving device 120, and/or pairing server 140. Database 150 may also include any combination of one or more databases controlled by memory controller devices (e.g., other server (s), etc.) or software, such as document management systems, Microsoft™ SQL databases, SharePoint™ databases, Oracle™ databases, Sybase™ databases, or other relational databases. In some embodiments, database 150 may comprise an associative array architecture, such as a key-value storage, for storing and rapidly retrieving large amounts of information about an individual.

Figure 2:
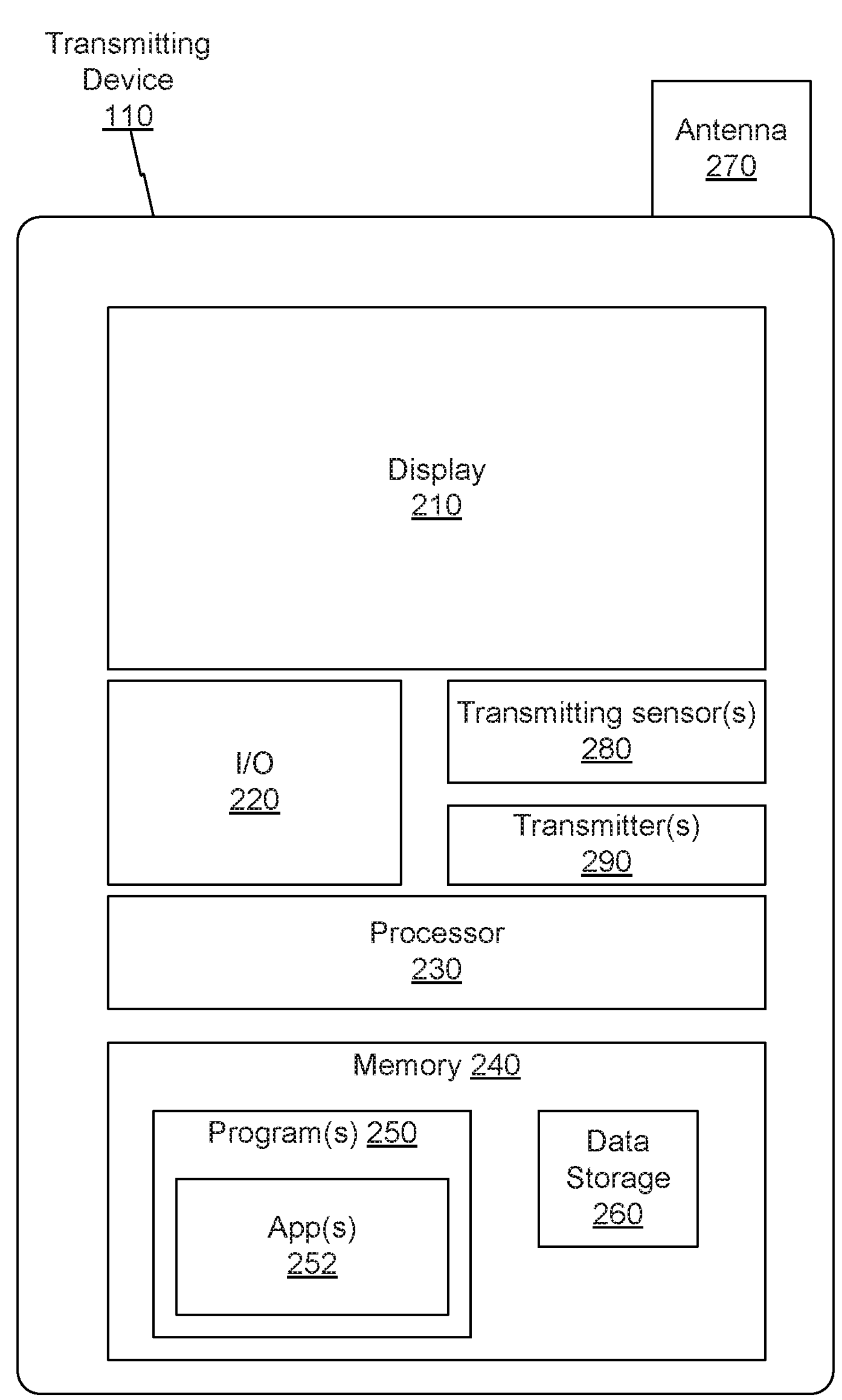
FIG. 2 is a block diagram of an example transmitting device configured to perform functions of the disclosed methods, consistent with disclosed embodiments.

FIG. 2 shows a block diagram of an example transmitting device 110 configured to perform functions of the disclosed methods, consistent with disclosed embodiments. As shown, transmitting device 110 may include a display 210, input/output ("I/O") devices 220, one or more processors 230, memory 240 having stored thereon one or more programs 250, such as one or more application(s) 252, and also data storage 260. Transmitting device 110 may also include an antenna 270 and one or more transmitting sensor(s) 280 and transmitter(s) 290. One or more of display 210, I/O devices 220, processor(s) 230, memory 240, antenna 270, transmitting sensor(s) 280, and transmitter(s) 290 may be communicatively coupled to one or more of the other devices depicted in FIG. 2. Such a connection may be accomplished using a bus or other interconnecting device.

I/O devices 220 may include one or more devices that enables transmitting device 110 to receive input from user 105 and provide feedback to user 105. I/O devices 220 may include, for example, one or more buttons, switches, speakers, microphones, or touchscreen panels. In some embodiments, I/O devices 220 may be manipulated by user 105 to input information into transmitting device 110.

Processor 230 may be one or more known processing devices, such as a microprocessor from the Pentium™ or Atom™ families manufactured by Intel™, the Turion™ family manufactured by AMD™, the Exynos™ family manufactured by Samsung™, or the Snapdragon™ family manufactured by Qualcomm™. Processor 230 may constitute a single core or multiple core processor that executes parallel processes simultaneously. For example, processor 230 may be a single core processor configured with virtual processing technologies. In certain embodiments, processor 230 may use logical processors to simultaneously execute and control multiple processes. Processor 230 may implement virtual machine technologies, or other known technologies to provide the ability to execute, control, run, manipulate, store, etc. multiple software processes, applications, programs, etc. In another embodiment, processor 230 may include a multiple-core processor arrangement (e.g., dual, quad core, etc.) configured to provide parallel processing functionalities to allow transmitting device 110 to execute multiple processes simultaneously. One of ordinary skill in the art would understand that other types of processor arrangements could be implemented that provide for the capabilities disclosed herein.

Memory 240 may be a volatile or non-volatile, magnetic, semiconductor, tape, optical, removable, non-removable, or other type of storage device or tangible (i.e., non-transitory) computer-readable medium that stores one or more program(s) 250 such as application 252, and data storage 260. Data storage 260 may store, for example, user 105's personal information, account information, displays, settings, one or more pairing configurations, one or more logs, and preferences.

Program(s) 250 may include operating systems (not shown) that perform known operating system functions when executed by one or more processors. By way of example, the operating systems may include Microsoft Windows™, Unix™, Linux™, Apple™, or Android™ operating systems, Personal Digital Assistant (PDA) type operating systems, such as Microsoft CE™, or other types of operating systems. Accordingly, disclosed embodiments may operate and function with computer systems running any type of operating system. Transmitting device 110 may also include communication software that, when executed by a processor, enables communications with network 130, such as a Web browser software, tablet, or smart device networking software, etc. Transmitting device 110 may also execute mobile applications for performing operations consistent with disclosed embodiments, such as a tablet or mobile device. In addition, program(s) 250 may include application(s) 252, such as an application for pairing, activating, setting up, and configuring transmitting device 110 for communicating with receiving device 120. In some embodiments, pairing applications 252 may include instructions which cause processor 230 to initiate or facilitate connections between transmitting device 110 and receiving device 120 via a primary communication method and secondary communication method.

Transmitting sensors 280 may include one or more devices capable of sensing the environment around transmitting device 110 and/or movement of transmitting device 110. In some embodiments, transmitting sensors 280 may include, for example, an accelerometer, a shock sensor, a gyroscope, a position sensor, a microphone, an ambient light sensor, a temperature sensor, a vibration sensor, a proximity sensor, and/or a conductivity sensor. One of ordinary skill in the art would understand that other types of transmitting sensors 280 can be included in transmitting device 110.

Transmitters 290 may include one or more devices capable of transmitting patterns in particular mediums. That is, transmitters 290 may comprise one or more elements capable of transmitting a pattern using one or more mediums of light, sound, thermal energy, vibrations, pulses of air, or the like to receiving device 120. For example, transmitters may include one or more light emitting elements capable of transmitting blinking, different colored lights, etc. to receiving device 120. Transmitters may also include thermoelectric devices, fans capable of producing pulse of air, motors capable of producing vibrations, speakers, etc. In the disclosed embodiments, transmitters may include specialized hardware elements of a form factor configured to be provided as part of a card or card type of transmitting device 110.

Figure 3:
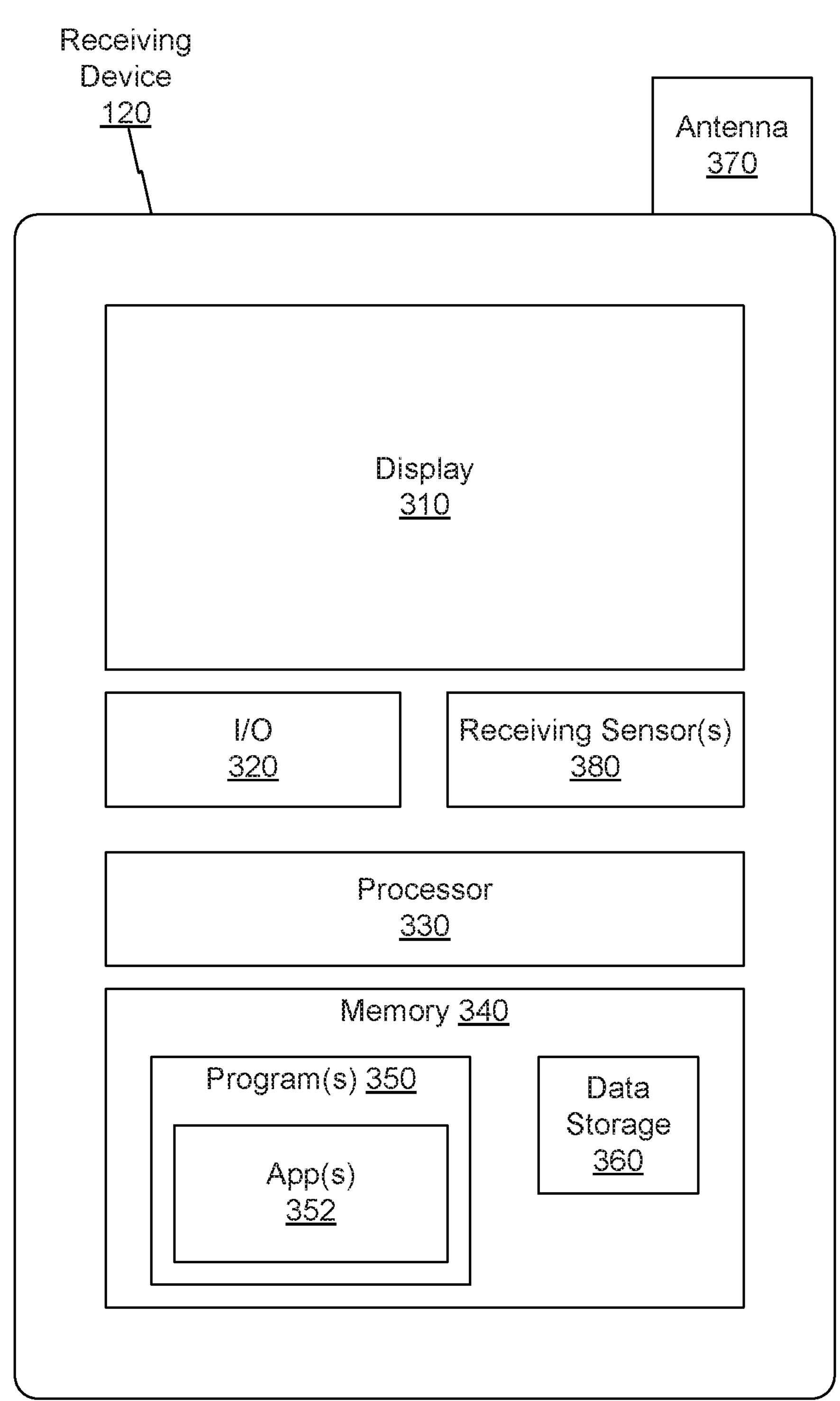
FIG. 3 is a block diagram of an example receiving device configured to perform functions of the disclosed methods, consistent with disclosed embodiments.

FIG. 3 shows a block diagram of an example receiving device 120 configured to perform functions of the disclosed methods, consistent with disclosed embodiments. As shown, receiving device 120 may include a display 310, input/output ("I/O") devices 320, one or more processors 330, memory 340 having stored thereon one or more programs 350, such as one or more application(s) 352, and also data storage 360. Receiving device 120 may also include an antenna 370 and one or more receiving sensor(s) 380. One or more of display 310, I/O devices 320, processor(s) 330, memory 340, antenna 370, or receiving sensor(s) 380 may be communicatively coupled to one or more of the other devices depicted in FIG. 3. Such a connection may be accomplished using a bus or other interconnecting device. Because receiving device 120 and transmitting device 110 may be the same type of device, it should be appreciated that they may share similar components, including those not shown. For example, receiving device 120 may include one or more transmitters 290.

Display 310, input/output ("I/O") devices 320, one or more processors 330, memory 340 having stored thereon one or more programs 350, such as one or more application(s) 352, and also data storage 360, and antenna 370 may be configured the same and may function the same as their corresponding structure explained with regard to FIG. 2.

Receiving sensors 380 may include one or more devices capable of sensing the environment around receiving device 120 and/or movement of receiving device 120. In some embodiments, receiving sensors 380 may include, for example, an accelerometer, a shock sensor, a gyroscope, a position sensor, a microphone, an ambient light sensor, a temperature sensor, a vibration sensor, a proximity sensor, and/or a conductivity sensor. In some embodiments, receiving sensors 380 may allow receiving device 120 to acquire a sensory pattern that represents a security key. The security key may allow receiving device 120 and transmitting device 110 to securely communicate or pair with each other. One of ordinary skill in the art would understand that other types of receiving sensors 280 can be included in receiving device 120.

Figure 4:
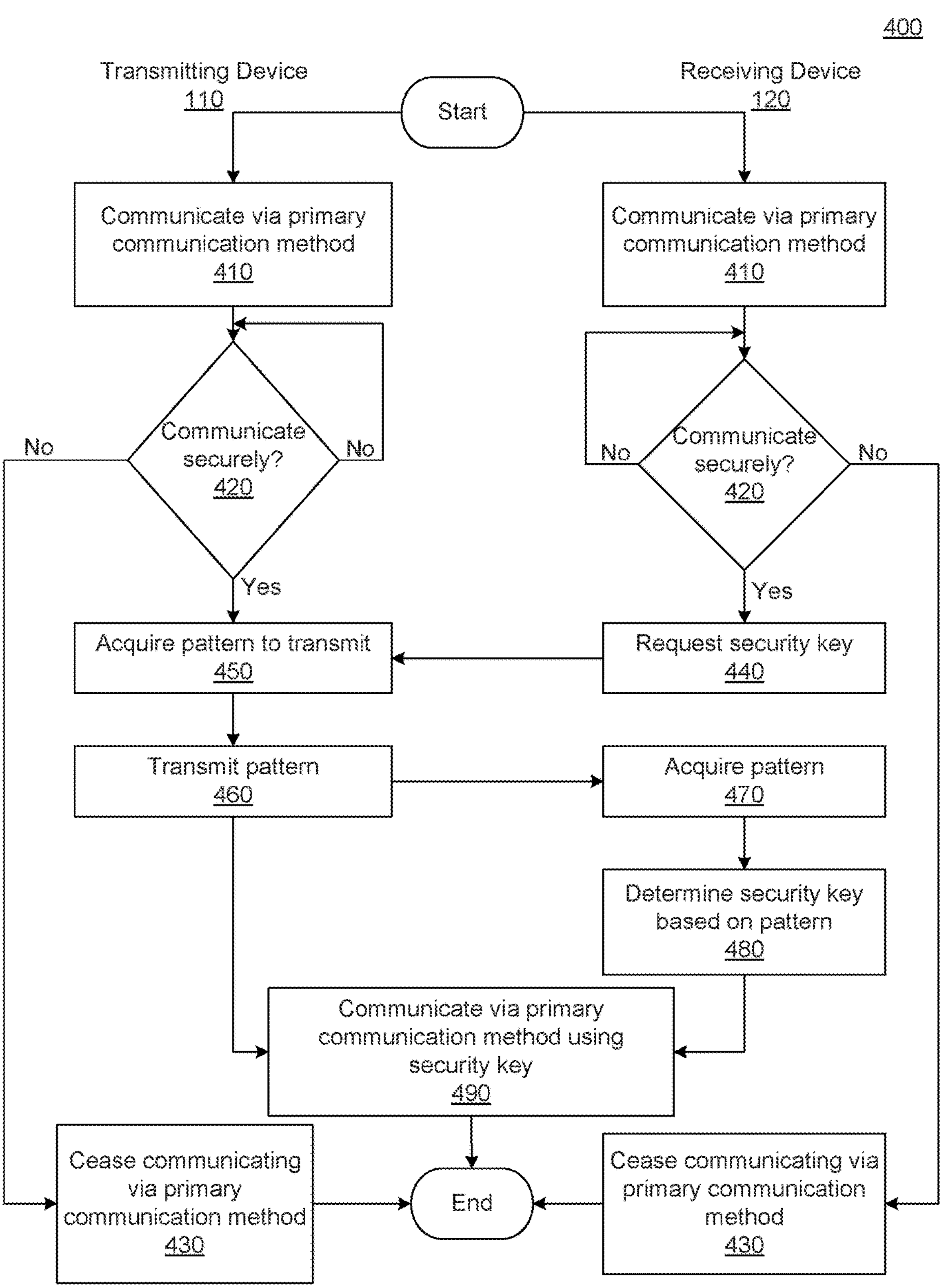
FIG. 4 is a flowchart of an example process for pairing devices for secure communication, consistent with disclosed embodiments.

FIG. 4 shows a flowchart of an example process for pairing devices for secure communication, consistent with the disclosed embodiments. In the following description, reference is made to certain components of FIG. 2 and FIG. 3 for purposes of illustration. It should be appreciated, however, that other implementations are possible and that components other than those illustrated above in FIG. 2 and FIG. 3 with respect to transmitting device 110 and receiving device 120 may be used to implement the example process of FIG. 4.

At step 410, transmitting device 110 and receiving device 120 may communicate with each other via a primary communication method. In some embodiments, the primary communication method involves transmitting device 110 and receiving device 120 communicating with each other over network 130 and/or local network 135 using wireless or radio communication techniques; in others, it does not. In some embodiments, transmitting device 110 or receiving device 120 may attempt to start communicating with the other device via the primary communication method when the device is turned on. In other embodiments, user 105 may initiate transmitting device 110, receiving device 120, or both, to begin communicating with each other via the primary communication method. In some embodiments, user 105 may provide some initial settings (e.g., account or network settings) in order to enable transmitting device 110 and/or receiving device 120 to communicate via the primary communication method.

The primary communication method may include wireless technologies, for example, radio communication technology, microwave communication technology, Wi-Fi, WiMax, ZigBee, Bluetooth™ technology, a form of mobile communication technologies (e.g., Global System for Mobile Communications, 3G, 4G, 5G, etc.), or the like. In some embodiments, transmitting device 110 and/or receiving device 120 may be configured to communicate via two or more primary communication methods. Accordingly, transmitting device 110 and/or receiving device 120 may be, for example, preprogrammed or configurable to communicate via a particular primary communication method with the other device, among multiple other enabled communication methods. In some embodiments, pairing server 140 may provide transmitting device 110 and/or receiving device 120 with the particular primary communication method.

Additionally, transmitting device 110 and/or receiving device 120 may access one or more pairing configurations to determine the primary communication method to enable communications with the other device. In some embodiments, transmitting device 110 and/or receiving device 120 may access the primary communication or pairing configurations from its own data storage (data storage 260 or data storage 360), pairing server 140, or database 150.

At step 420, transmitting device 110 and/or receiving device 120 may determine whether to communicate via a secure communication, such as by using a security key, for example. A determination to communicate via a secure communication may also include a determination whether to initiate operations for communicating or exchanging a security key. In some embodiments, transmitting device 110 and/or receiving device 120 may make this determination by receiving and interpreting a notification from pairing server 140 requiring the devices to initiate a secure communication. Transmitting device 110 and/or receiving device 120 may also determine whether to communicate via a secure communication based on configuration information or other information associated with an application stored locally on the device and/or from preprogrammed logic.

In some embodiments, transmitting device 110 and/or receiving device 120 may also determine to communicate via a secure communication by detecting the proximity of the other device using a proximity sensor which may be one of transmitting sensors 280 and/or receiving sensors 380. Transmitting device 110 and/or receiving device 120 may also use other types of sensors to detect the proximity of the other device. For example, transmitting device 110 and/or receiving device 120 may use a GPS sensor, which may be one of transmitting sensors 280 and/or receiving sensors 380, to detect the proximity of the other device. In one implementation, transmitting device 110 and/or receiving device 120 may use its GPS sensor to compare its GPS coordinates to coordinates of the other device that have been acquired by pairing server 140 or communicated to it by the other device. It should be understood that transmitting device 110 or receiving device 120 may use other ways or sensors to detect its proximity to the other device.

After transmitting device 110 or receiving device 120 detects its proximity to the other device, transmitting device 110 or receiving device 120 may determine whether transmitting device 110 or receiving device 120 is within a range for secure communication based on the disclosed techniques for communicating a sensory pattern. A determination that the devices are within suitable or sufficient range for securely communicating may trigger operations associated with providing a secure communication, such as operations for communicating or exchanging a security key. In some embodiments, transmitting device 110 or receiving device 120 may request pairing server 140 to determine whether transmitting device 110 or receiving device 120 is within a range for secure communication. In some embodiments, transmitting device 110 and/or receiving device 120 may determine whether transmitting device 110 or receiving device 120 is within a range for secure communication based on determining that the other device is positioned over and/or on at least a part of a container or box or other structure.

In some embodiments, transmitting device 110 or receiving device 120 may compare the detected proximity of the other device to a predetermined value to determine whether transmitting device 110 or receiving device 120 is within a range for secure communication. For example, if the detected proximity is less than the predetermined value, transmitting device 110 or receiving device 120 may determine that the other device is within a range for secure communication. However, if the detected proximity is greater than the predetermined value, then transmitting device 110 or receiving device 120 may determine that the other device is not within a range for secure communication. The transmitting device 110 or receiving device 120 may be preprogrammed with the predetermined value or may acquire the predetermined value from the pairing server 140. The disclosed embodiments include other known ways to compare the detected proximity to a predetermined value or acquire the predetermined value, and the above examples are not limiting.

If transmitting device 110 or receiving device 120 determines that it is not within a range for secure communication, transmitting device 110 or receiving device 120 may determine not to communicate via a secure communication, according to the disclosed embodiments. In some embodiments, transmitting device 110 or receiving device 120 may continuously determine at predetermined intervals of time to whether the other device is within a range for secure communication according to the disclosed embodiments.

If transmitting device 110 or receiving device 120 determines not to invoke a secure communication or initiate operations for securely communicating, then transmitting device 110 or receiving device 120 may, in some embodiments, cease communicating via the primary communication method (step 430). Additionally or alternatively, in some embodiments, transmitting device 110 or receiving device 120 may continuously determine, at predetermined intervals of time, whether to initiate operations for secure communications. In some embodiments, transmitting device 110 and receiving device 120 may continue to communicate using the primary communication method with the understanding that the environment is not secure. If transmitting device 110 or receiving device 120 determines to invoke a secure communication, transmitting device 110 and/or receiving device 120 may initiate operations for securely communicating with each other. In some embodiments, transmitting device 110 or receiving device 120 may determine whether a security key is available for initiating a secure communication. If it is determined that a security key is not available, then transmitting device 110 or receiving device 120 may initiate one or more operations for obtaining a security key.

For example, if receiving device 120 determines that a security key is not available to it, then receiving device 120 may send a request for a security key to transmission device 110 (step 440). Thereafter, transmission device 110 may acquire (step 450) and transmit (step 460) a pattern representing the security key to receiving device 120 via a second communication method. If transmitting device 110 determines that a security key is not available to it, then it may acquire (step 450) and transmit (step 460) a pattern representing the security key to receiving device 120 via the second communication method without receiving a notification.

At step 450, transmitting device 110 may acquire a pattern representing a security key that may be used for secure communication with receiving device 120. In some embodiments, transmitting device 110 may acquire the pattern representing the security key from a pairing configuration or another form of data located on pairing server 140, database 150, applications 252, or data storage 260.

In some embodiments, transmitting device 110 may acquire the pattern representing a security key based on a received or accessed security key. For example, transmitting device 110 may acquire a security key and/or a cipher or encoding scheme from a pairing configuration or another form of data located on pairing server 140 or database 150, for example. Transmitting device 110 may use the cipher or encoding scheme to translate the security key into a pattern, such as a sensory pattern to be communicated to receiving device 120. A variety of types of cipher or encoding schemes or protocols may be used, such as steganography, rotation encryption (e.g., ROT1), transposition, Morse code, Caesarian Shift Cipher, monolaphabetic substitution, Vigenere, true code, Enigma Code, etc., to translate the security key into the sensory pattern to be transmitted.

At step 460, transmitting device 110 may use one of transmitters 290 to send a sensory pattern representing a security key to receiving device 120. For example, transmitting device 110 may cause a light transmitter (or optical transmitter) to pulsate light in a determined pattern, which receiving device 120 may acquire at step 470 via a light sensor (or optical receiver).

At step 480, receiving device 120 may determine the security key based on the acquired pattern. In some embodiments, receiving device 120 may send a request to server 140 so that the pairing server 140 may determine the security key. Pairing server 140 may then send the determination to receiving device 120. In some embodiments, receiving device 120 may decipher the pattern to determine the security key by using one or more deciphering or decoding schemes corresponding to the respective cipher/encoding schemes used to transmit the sensory pattern representative of a security key. In some embodiments, receiving device 120 may attempt to use one or more deciphering or decoding schemes through trial and error to determine the security key based on the acquired pattern. In some embodiments, receiving device 120 may identify the corresponding deciphering or decoding scheme from a communication transmitted by transmitting device 110 to receiving device 120 via the primary communication method of step 410, for example. In other embodiments, receiving device 120 may acquire the corresponding deciphering or decoding scheme from a separate sensory pattern received from the transmitting device, or from a portion of the same sensory pattern that is representative of a security key, transmitted by transmitting device 110. As another example, receiving device 120 may also acquire one or more deciphering or decoding schemes for deciphering the pattern from a pairing configuration, one or more applications 352, a pairing server 140, a database 150, or data storage 360. Although not shown, if receiving device 120 cannot determine the security key based on an acquired pattern, receiving device 120 may request transmission of a new security key or new pattern or cease communication using the primary communication method (step 430).

If receiving device 120 determines the security key based on the acquired pattern, transmitting device 110 and/or receiving device 120 may securely communicate via the primary communication method using the security key. Transmitting device 110 and/or receiving device 120 may use the security key to securely communicate via one or more primary communication methods in multiple ways. For example, transmitting device 110 and/or receiving device 120 may use the security key to encrypt and/or decrypt messages that it uses to communicate with the other device. As another example, transmitting device 110 and/or receiving device 120 may use the security key as a password to authenticate the other device and/or to check that the other device can be trusted.

Figure 5:
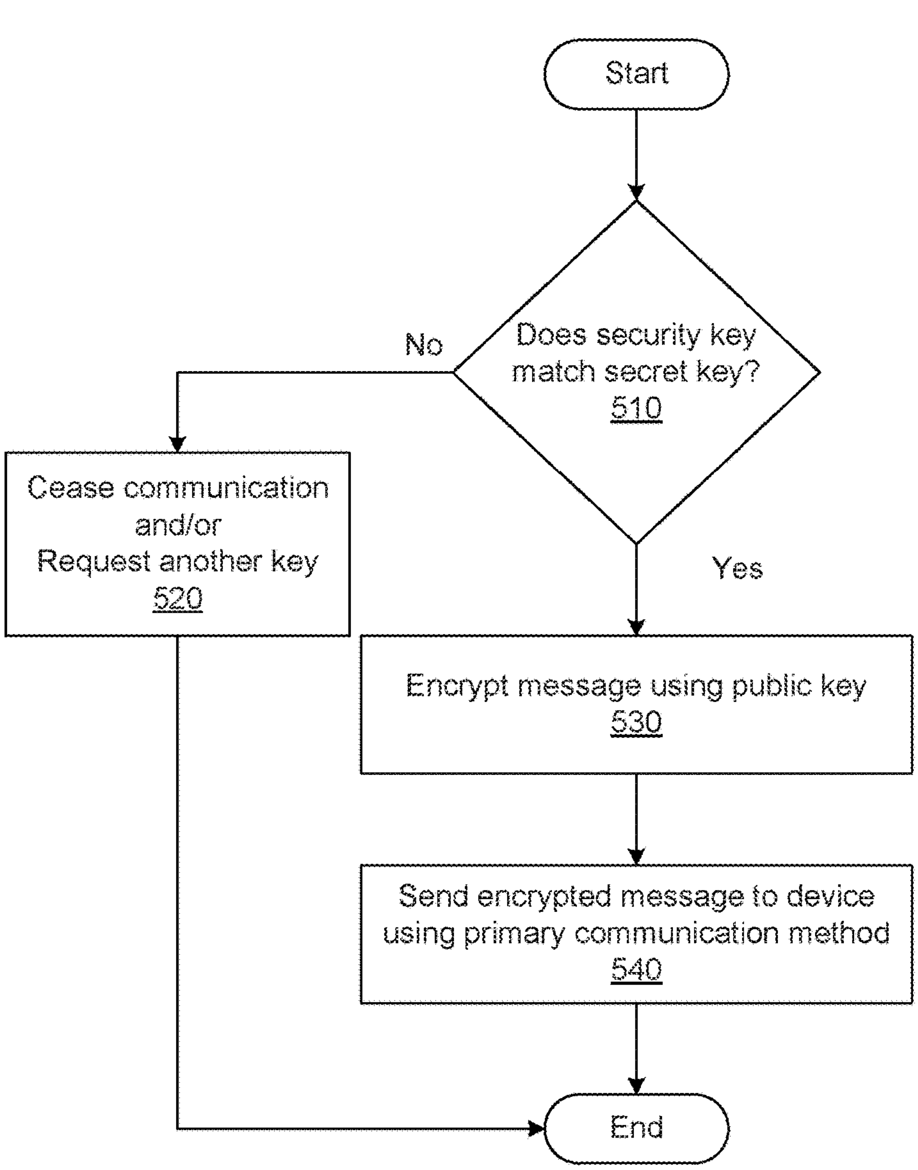
FIG. 5 is a flowchart of an example process for authenticating devices using a security key, consistent with disclosed embodiments.

Turning to FIG. 5, an example process for authenticating devices using a security key, is shown. At step 510, transmitting device 110 and/or receiving device 120 may determine whether the security key identified by receiving device 120 (at step 480) matches a secret key that it has in memory 240 or 340, data storage 260 or 360, processed by processor 230 or 330 or preprogrammed into one of applications 252 and 352, or that exists on or in pairing configurations, pairing server 140 or database 150. For example, receiving device 120 may compare the determined (e.g. deciphered or decoded) security key that it received based on the acquired pattern (step 470) to a secret key acquired by request from pairing server 140 or database 150. In some embodiments, the secret key acquired from pairing server 140 or database may be received responsive to the pairing server 140 or another system authenticating receiving device 120. In another example, transmitting device 110 may cause receiving device 120 to determine that the security key deciphered by receiving device 120 matches a secret key. For example, transmitting device 110 may send a request to receiving device 120 to determine that the security key deciphered by receiving device 120 matches a secret key by sending a request to receiving device via the primary communication method. In some embodiments, transmitting device may send the request through pairing server 140 to receiving device 120.

If the determined security key does not match a known or possessed secret key, transmitting device 110 and/or receiving device 120 may cease communication with the other device (step 520 which corresponds to step 430 in FIG. 4). In some embodiments, transmitting device 110 and/or receiving device 120 may additionally/alternatively request a new security key (step 520). In some embodiments, the determined security key matches the known or possessed secret key, then transmitting device 110 and/or receiving device 120 may securely communicate via the primary communication method. In some embodiments, the determined security key may function as a symmetric key according to a symmetric encryption algorithm and used for both encrypting and decrypting communications between transmitting device 110 and receiving device 120. In some embodiments, the determined security key may include a public key associated with an asymmetric key algorithm. For example, transmitting device 110 and/or receiving device 120 may encrypt a message using its respective private key (step 530) and send the encrypted message to the other device via the primary communication method (step 540), where the other device decrypts the message using the security key, the secret key, or another key it can acquire. One of ordinary skill in the art would appreciate that a multitude of other techniques and methods may be used for transmitting device 110 and/or receiving device 120 to securely communicate with each other via one or more primary communication methods using a security key acquired and determined according to the disclosed embodiments.

Figure 6:
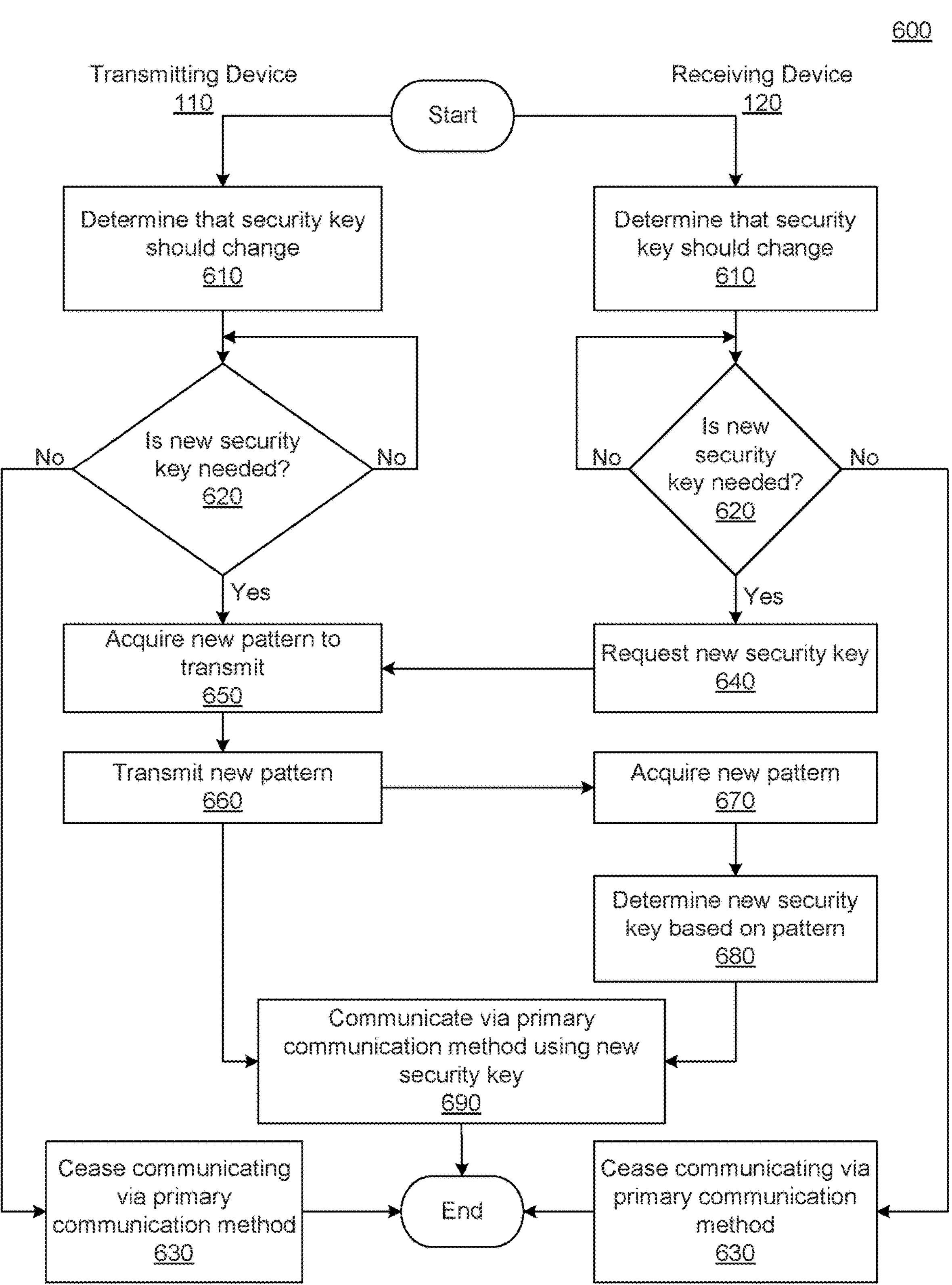
FIG. 6 is a flowchart of an example process for replacing a security key, consistent with disclosed embodiments.

FIG. 6 shows a flowchart of an example process for replacing a security key, consistent with disclosed embodiments. Transmitting device 110 and/or receiving device 120 may determine to change or replace a security key that has been shared and used to communicate via the primary communication. It may be advantageous to change a security key for a number of reasons, including the detection of fraud, a manual change requested by user 105, a detection of a breached security mechanism, transmitting device 110 and/or receiving device 120 encountering an error using while using the security key, etc. In some embodiments, transmitting device 110 and/or receiving device 120 may receive a notification from pairing server 140 to replace or update the security key. In some embodiments, transmitting device 110 and/or receiving device 120 may determine to replace a security key that has been shared responsive to detecting, for example, inconsistent or out-of-place messages. In some embodiments, transmitting device 110 and/or receiving device 120 may detect an out-of-place message by acquiring the wrong response during a verification or handshake process. The handshake process could take place in many ways known in the art, such as a handshake similar to the TCP three-way handshake, the TLS handshake, etc. As another example, transmitting device 110 and/or receiving device 120 may determine to change or replace a security key responsive to determining that the security key has been used longer than a predetermined amount of time (i.e. time of validity). After determining to replace or change the security key, transmitting device 110 and/or receiving device 120 may initiate and/or perform one or more steps (620-690) for replacing the security key. Steps 620-690 may be similar to those previously described in FIG. 4 above (420-490) in view of pairing transmitting device 110 and receiving device 120 using a new security key, and thus a detailed description of these steps is omitted here for conciseness.

Figure 7:
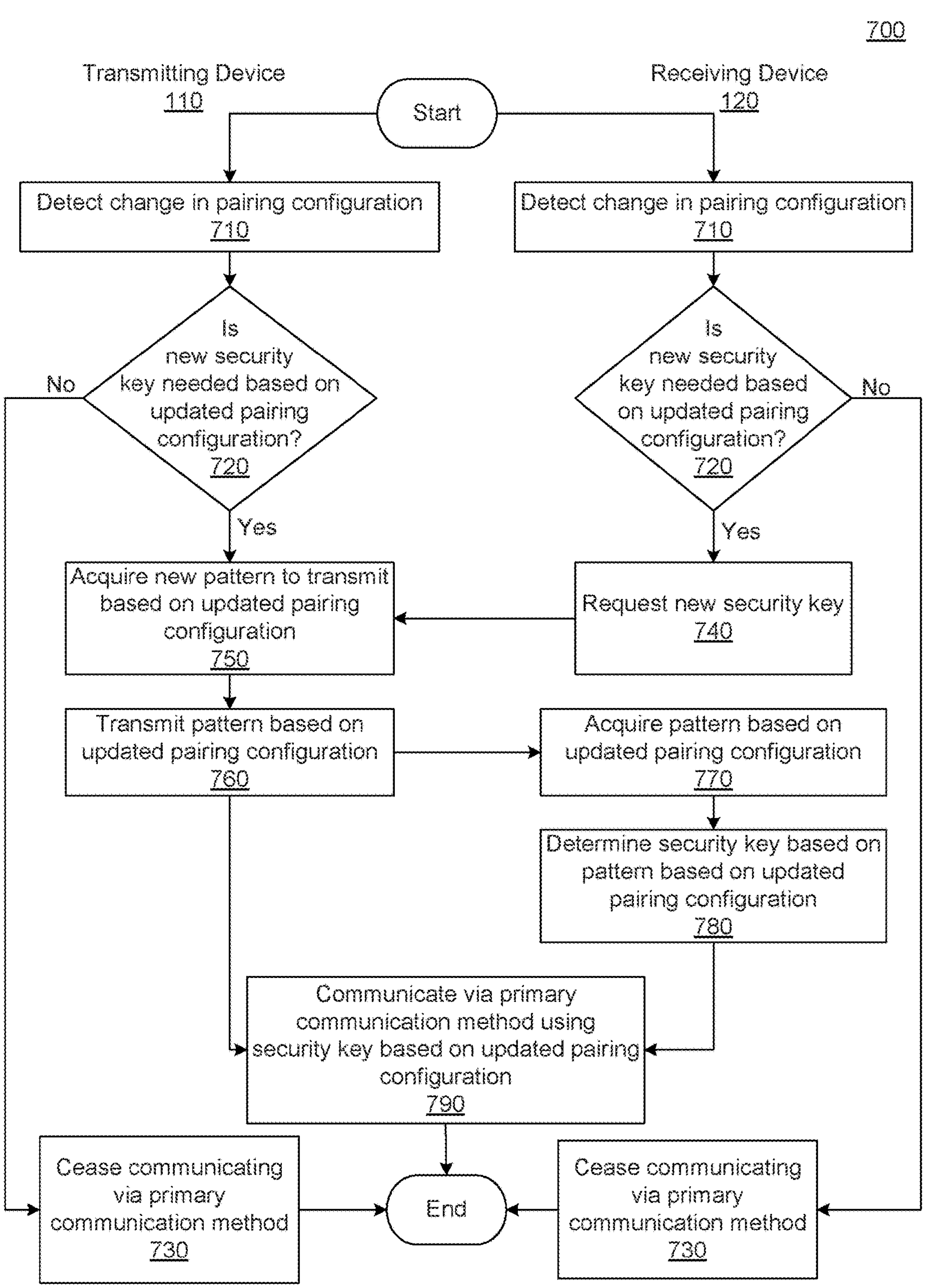
FIG. 7 is a flowchart of an example process for utilizing for updating a process for pairing devices for secure communication based on a pairing configuration, consistent with disclosed embodiments.

FIG. 7 shows a flowchart of an example process for pairing devices for secure communication based on a pairing configuration, consistent with disclosed embodiments. As discussed above, a pairing configuration may allow the transmitting device 110, receiving device 120, pairing server 140, or an outside process to change the pairing configuration in real time.

At step 710, transmitting device 110 and/or receiving device 120 may detect a changed or updated pairing configuration by detecting a change in one or more parameters of a pairing configuration. For example, in some embodiments, transmitting device 110 and/or receiving device 120 may receive a notification from pairing server 140 that a parameter in the pairing configuration has changed. In some embodiments, transmitting device 110 and/or receiving device may change or update a parameter in the pairing configuration at the pairing server and/or in a local storage. Once a change or an updated parameter in the pairing configuration is detected, transmitting device 110 and/or receiving device 120 may initiate or perform one or more steps (720-790) for updating a security key based on the updated pairing configuration. Steps 720-790 are similar to those previously described in FIG. 4 above (420-490) and in FIG. 6 (620-690), and thus a detailed description of these steps is omitted here for conciseness. Steps 720-790 may differ from steps 620-690 and 420-490 in that transmitting device 110 and receiving device 120 perform the respective operations based on a changed or updated pairing configuration.

In some embodiments, transmitting device 110 and receiving device 120 may acquire a pairing configuration from pairing sever 140 or data storage 260 or 360. The pairing configuration may include parameters that define how the transmitting device 110 and receiving device 120 communicate with each other. For example, the pairing communication may include parameters, such as a type of primary communication method, secondary communication method, ciphering or encoding scheme, deciphering scheme, security key, etc. In some embodiments, pairing configuration allows the transmitting device 110 and/or receiving device 120 to change an aspect of communication (e.g., primary communication method, deciphering scheme, etc.) in real time.

Transmitting device 110 and/or receiving device 120 may report or log any of the steps discussed above in FIGS. 5-10 into a pairing server 140 and database. Moreover, the disclosed embodiments can be used in many different applications. A few example applications follow:

- Pairing a medical device to a smartphone to monitor a patient's vital signs;
- Pairing a smart card to a smartwatch to monitor transactions in real time;

Pairing a car to a tablet to monitor analytics related to various driving conditions of the car in real time;

Pairing an unmanned aerial vehicle to a universal controller to control the movement of the unmanned aerial vehicle;

Pairing a smart home device, such as a smart lock, thermostat, light, etc., with a smartphone to control the smart home device; and Pairing a key fob to a smart lock to control and monitor the smart lock.

Descriptions of the disclosed embodiments are not exhaustive and are not limited to the precise forms or embodiments disclosed. Modifications and adaptations of the embodiments will be apparent from consideration of the specification and practice of the disclosed embodiments. For example, the described implementations include hardware, firmware, and software, but systems and techniques consistent with the present disclosure may be implemented as hardware alone. Additionally, the disclosed embodiments are not limited to the examples discussed herein.

Computer programs based on the written description and methods of this specification are within the skill of a software developer. The various programs or program modules may be created using a variety of programming techniques. For example, program sections or program modules may be designed in or by means of Java, C, C++, assembly language, or any such programming languages. One or more of such software sections or modules may be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps or inserting or deleting steps. It is intended, therefore, that the specification and examples be considered as example only, with the true scope and spirit being indicated by the following claims and their full scope of equivalents.

What is claimed is:

1. A first communication device for performing secure communications, the first communication device comprising:

one or more processors and memory storing instructions that, when executed by the one or more processors, cause the one or more processors to:

in response to determining that a second communication device is within a range of the first communication device for secure communicating using a short-range wireless radio communication method, capture, via one or more sensors of the first communication device, one or more non-light sensory patterns outputted by the second communication device via a sensory communication method different from the short-range wireless radio communication method, wherein the one or more non-light sensory patterns encode a security key;

determine, using one or more decoding schemes, the security key based on the one or more non-light sensory patterns; and receive encrypted messages from the second communication device via the short-range wireless radio communication method and decrypt the encrypted messages using the security key.

2. The first communication device of claim 1, wherein the one or more non-light sensory patterns comprise at least one of a sound pattern, a thermal energy pattern, or a vibration pattern, encoding the security key.

3. The first communication device of claim 1, wherein a cipher or encoding scheme is used to translate the security key into the one or more non-light sensory patterns.

4. The first communication device of claim 1, wherein the one or more decoding schemes are acquired using a separate sensory pattern received from the second communication device or from a portion of the one or more non-light sensory patterns.

5. The first communication device of claim 1, wherein the second communication device being within the range of the first communication device for secure communicating comprises determining that the first communication device or the second communication device is positioned over at least a part of a structure or is positioned on at least the part of the structure.

6. The first communication device of claim 1, wherein the second communication device being within the range of the first communication device for secure communicating is based on a determination that a proximity of the first communication device to the second communication device is less than a predetermined value pre-programmed to at least one of the first communication device or the second communication device.

7. One or more non-transitory computer-readable media storing computer program instructions that, when executed by one or more processors, effectuate operations comprising:

based on detecting a second communication device within a range of a first communication device for secure communicating using a first communication method, receiving a sensory pattern from the second communication device via a second communication method different from the first communication method;

determining, using one or more decoding schemes, a security key based on the sensory pattern; and receiving, from the second communication device, via the first communication method, encrypted messages and decrypting the encrypted messages using the security key.

8. The one or more non-transitory computer-readable media of claim 7, wherein the sensory pattern represents the security key using at least one of a visible light pattern, a non-visible light pattern, a sound pattern, a thermal energy pattern, or a vibration pattern.

9. The one or more non-transitory computer-readable media of claim 7, wherein a cipher or encoding scheme is used to translate the security key into the sensory pattern.

10. The one or more non-transitory computer-readable media of claim 7, wherein the one or more decoding schemes are acquired using a second sensory pattern received from the second communication device using a third communication method different from at least one of the first communication method or the second communication method.

11. The one or more non-transitory computer-readable media of claim 7, wherein the second communication device being within the range of the first communication device for secure communicating comprises:

determining that the first communication device or the second communication device is positioned over at least a part of a structure or is positioned on at least the part of the structure.

12. The one or more non-transitory computer-readable media of claim 7, wherein the second communication device being within the range of the first communication device for secure communicating is based on a determination that a proximity of the first communication device to the second communication device is less than a predetermined value pre-programmed to at least one of the first communication device or the second communication device.

13. The one or more non-transitory computer-readable media of claim 7, wherein the sensory pattern is received in response to determining that a previously used security key is to be replaced.

14. The one or more non-transitory computer-readable media of claim 7, wherein the first communication method comprises wireless technologies, the second communication method comprises close-range non-radio modes of communication.

15. A method, implemented by one or more processors, comprising:

receiving a sensory pattern in connection with a second communication device being detected within a range of a first communication device for secure communication using a first communication method, wherein the sensory pattern is received from the second communication device via a second communication method different from the first communication method;

determining, using one or more decoding schemes, a security key based on the sensory pattern; and receiving, via the first communication method, encrypted messages and decrypting the encrypted messages using the security key.

16. The method of claim 15, wherein the sensory pattern represents the security key using at least one of a visible light pattern, a non-visible light pattern, a sound pattern, a thermal energy pattern, or a vibration pattern.

17. The method of claim 15, wherein a cipher or encoding scheme is used to translate the security key into the sensory pattern.

18. The method of claim 15, wherein the one or more decoding schemes are acquired using a third communication method that is different from at least one of the first communication method or the second communication method.

19. The method of claim 15, wherein the second communication device being within the range of the first communication device for secure communication comprises:

determining that the first communication device or the second communication device is positioned over at least a part of a structure or is positioned on at least the part of the structure.

20. The method of claim 15, wherein the second communication device being detected within the range of the first communication device for secure communication is based on a determination that a proximity of the first communication device to the second communication device is less than a predetermined value pre-programmed to at least one of the first communication device or the second communication device.

* * * * *